INVENTOR
*Edwin L. Cline*

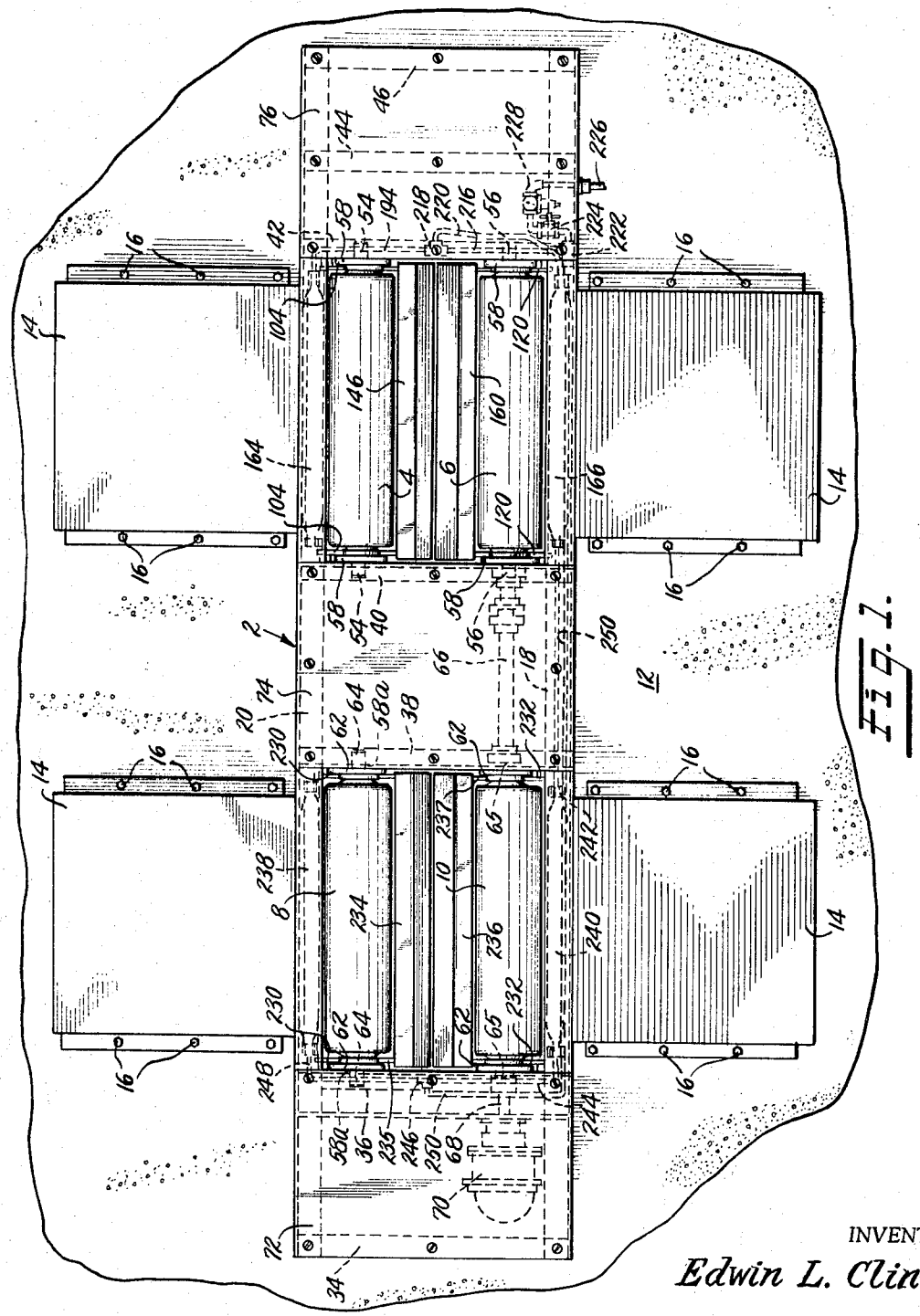

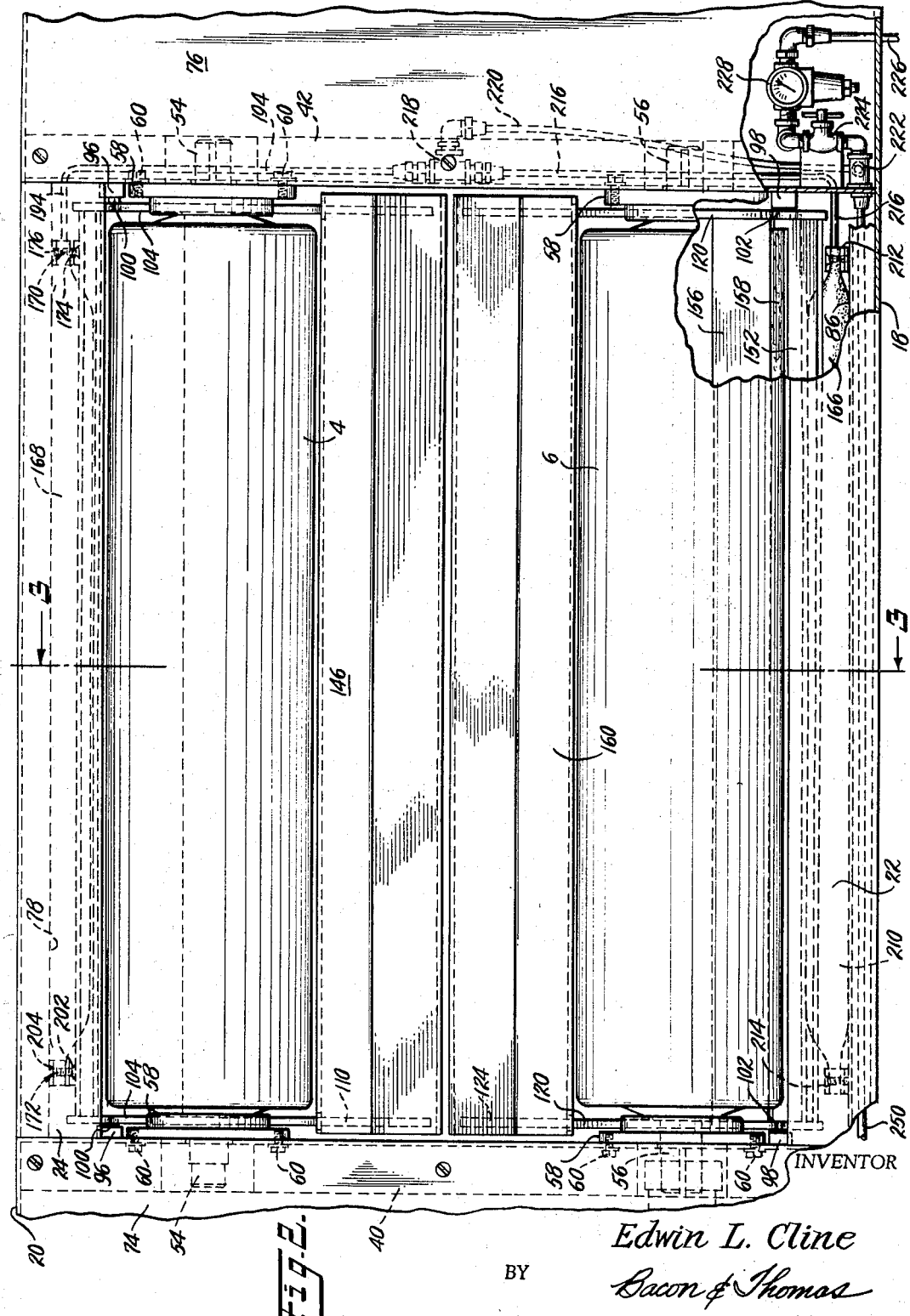

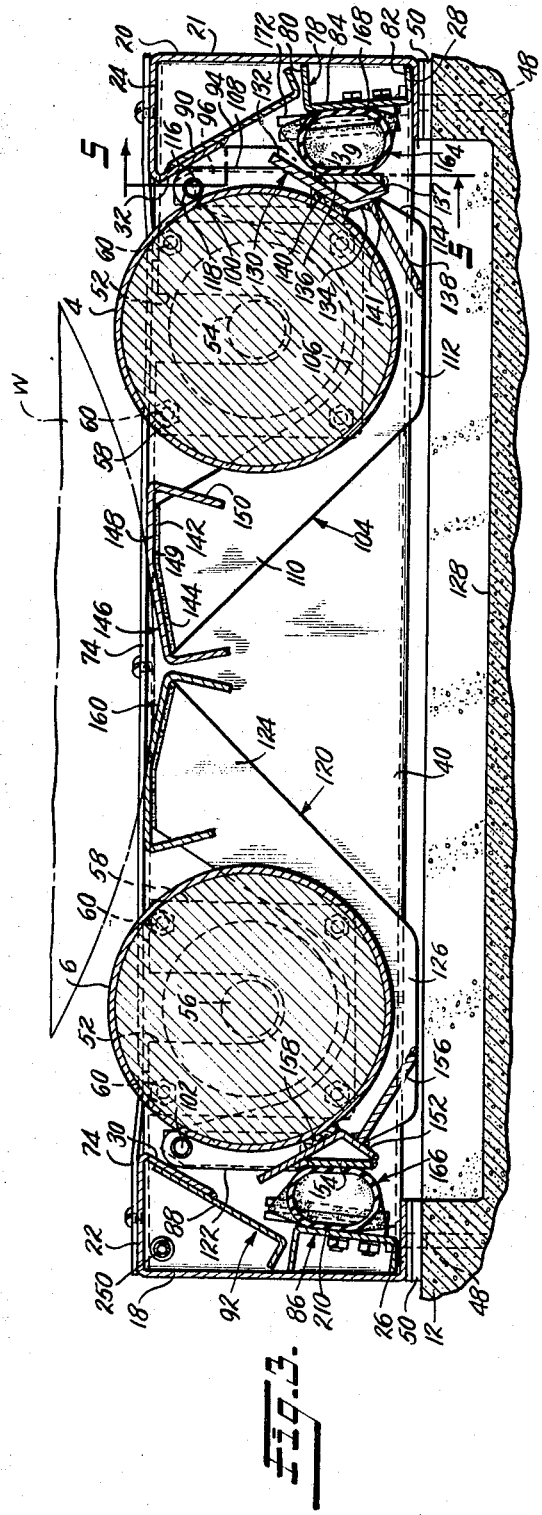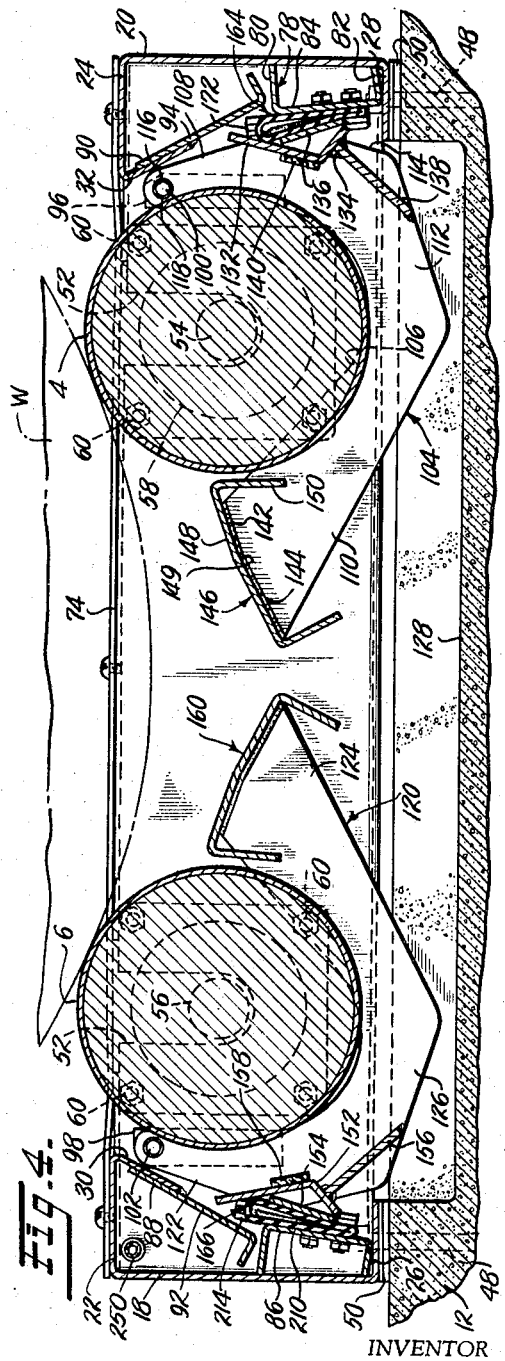

BY *Bacon & Thomas*

ATTORNEYS

United States Patent Office 3,443,427
Patented May 13, 1969

3,443,427
ROLL BRAKE AND VEHICLE WHEEL LIFT FOR CHASSIS DYNAMOMETERS
Edwin L. Cline, Pasadena, Calif., assignor to Clayton Manufacturing Company, El Monte, Calif., a corporation of California
Filed May 6, 1965, Ser. No. 453,611
Int. Cl. G01m *15/00*
U.S. Cl. 73—117                                    18 Claims

ABSTRACT OF THE DISCLOSURE

A roll brake and vehicle wheel lift device for applying a braking force to hold the rolls of a chassis dynamometer against rotation while substantially simultaneously lifting the vehicle wheels out of engagement therewith.

---

This invention relates generally to motor vehicle chassis dynamometers of the type employing spaced, cylindrical rolls for transmitting power from the drive wheels of a vehicle to a power absorption unit, and more particularly to a roll brake and vehicle wheel lift device designed to apply a braking force to hold the rolls of such a dynamometer against rotation while substantially simultaneously lifting the vehicle wheels out of engagement therewith, whereby to facilitate removal of the vehicle from said rolls.

Chassis dynamometers are commonly employed to analyze the performance of motor vehicle engines, and to detect malfunctioning or defects in other parts of a motor vehicle. Generally, dynamometers of the type to which this invention relates comprise a flat bed or frame having mounted horizontally thereon one or more pairs of parallel cylindrical rolls spaced to be engaged, and to be driven, by motor vehicle drive wheels cradled thereon. In instances where only one pair of rolls is utilized, they have a length sufficient to permit both of the drive wheels of the motor vehicle to engage the same.

Normally, little difficulty is encountered in driving a motor vehicle onto the frame of the apparatus to cradle the drive wheels between the rolls. However, because the rolls are mounted in bearings and rotate with the drive wheels, difficulty is encountered when an attempt is made to drive the vehicle either forwardly or rearwardly off the rolls. This problem is overcome by providing novel means for lifting the vehicle wheels off the rolls and also holding the rolls stationary, thereby enabling the vehicle to be readily removed from the rolls.

The principal object of the present invention is to provide an apparatus operable to brake a cylindrical roll against rotation, and to substantially simultaneously lift a wheel resting on said roll, out of engagement therewith.

A further object is to provide a dynamometer roll brake and wheel lift apparatus that is relatively easy to install, and which requires minimum servicing and adjustment during a normal life expectancy.

Another object is to provide a remotely controlled roll brake and vehicle wheel lifting apparatus for a chassis dynamometer, designed to be actuatable simultaneously on all the rolls of said dynamometer.

It is also an object to provide a combined chassis dynamometer roll brake and vehicle wheel lifting apparatus that is designed to be compatible with, and applicable to, existing dynamometer equipment.

A further object is to provide vehicle wheel lift apparatus wherein the gap between the rolls is substantially filled by the wheel engaging means even when the lift apparatus is retracted, thereby minimizing danger of someone falling between the rolls, particularly in installations having a deep pit beneath the rolls.

Other objects and many of the attendant advantages of the invention will become apparent from the following description when considered in connection with the accompanying drawings, wherein:

FIG. 1 is a plan view of a chassis dynamometer, showing in particular two pairs of rolls with the combined brake and vehicle wheel lift mechanism of the present invention associated therewith;

FIG. 2 is an enlarged plan view of the righthand pair of rolls of FIG. 1, with one of the rolls and portions of the dynamometer frame broken away to show certain details of construction;

FIG. 3 is an enlarged vertical sectional view taken along the line 3—3 of FIG. 2, showing the brake and vehicle wheel lift mechanism in an applied condition braking the dynamometer rolls, and holding a vehicle wheel raised clear of the rolls;

FIG. 4 is a vertical sectional view similar to FIG. 3, but with the brake and vehicle wheel lift mechanism in a retracted condition, wherein a wheel can engage the rolls;

Figure 5:
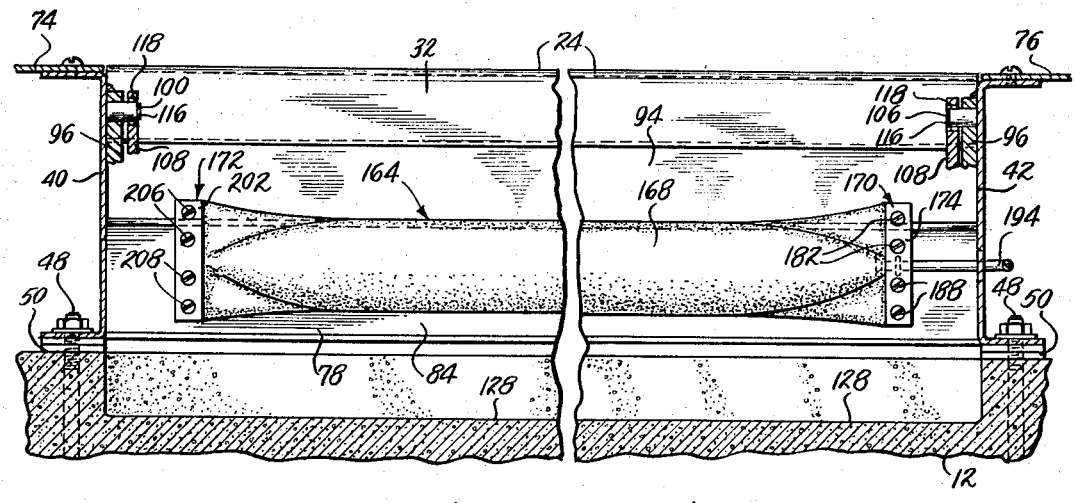
FIG. 5 is a fragmentary vertical sectional view, taken on the line 5—5 of FIG. 3.

Referring now to the drawings, the frame of the chassis dynamometer is indicated generally at 2, and has mounted thereon a first pair of horizontal, spaced parallel cylindrical rolls 4 and 6, and a second like pair of rolls 8 and 10. The rolls 6 and 10 are axially aligned drive rolls, and the rolls 4 and 8 are axially aligned idle rolls. The frame 2 normally rests upon a siutable floor 12 (FIGS. 3 and 4), and hence projects a distance thereabove. To facilitate movement of wheeled vehicles thereover, inclined ramps 14 are provided on both sides of the frame 2, said ramps being secured to the floor 12 by bolts 16. It is to be understood, however, that the invention is equally applicable to a pit type chassis dynamometer installation, wherein the top of the frame 2 would lie substantially flush with the floor, and ramps would not be needed.

The frame 2 comprises a pair of longitudinally disposed, confronting, generally U-shaped channel members 18 and 20, the upper legs 22 and 24,, respectively, of each channel being longer than the lower legs 26 and 28 thereof and terminating in downwardly and outwardly inclined lips 30 and 32, respectively. The longitudinal members 18 and 20 are interconnected by transversely extending channel members 34, 36, 38, 40, 42, 44 and 46, all of which are welded or otherwise rigidly secured together. The channel-shaped cross members 36-38, and 40-42 face in opposite directions, and bolts 48 (FIGS. 3 and 4) pass through the lower legs 26 and 28, of the channel members 18 and 20, and the lower legs of the channel members 34 to 46 to secure the frame to the floor 12; shims 50 of suitable thickness may be inserted between the frame 2 and the floor for the purpose of compensating for unevenness in the floor and for leveling the frame.

Each of the cross members 40 and 42 has U-shaped recesses 52 therein (FIGS. 3 and 4) for receiving the supporting stub shafts 54 and 56 of the rolls 4 and 6, suitable bearings 58 being secured in position by bolts 60 to said cross members to mount said stub shafts for free rotation. The cross members 36 and 38 (FIG. 2) have similar recesses 58a therein, and bearings 62 are secured in position in said recesses for supporting the oppoite ends of the stub shafts 64 and 65 for the rolls 8 and 10, respectively.

A shaft 66 connects one of the stub shafts 56 and 65 of the drive rolls 6 and 10; thus, rolls 6 and 10 will rotate together. The other stub shaft 65 of the roll 10, and hence its connected roll 6, is connected by a shaft 68 to a hydraulic power absorption unit 70, which is itself supported by said shaft. The unit 70 may be of the type shown in my Patent 2,768,711, and hence need not be described in detail. Briefly, its function is to absorb power transmitted to the drive rolls 6 and 10 by the drive wheels W of a vehicle cradled thereon. Cover plates 72, 74 and 76 are suitably secured to the underlying frame channel members 34, 36, 38, 40, 42, 44 and 46, and function to cover the recesses 52 and 58a and to enclose and protect the power absorption unit 70, shaft 66, and other equipment contained within said frame.

The combined chassis dynamometer roll brake and vehicle wheel lifting apparatus of the invention will be described in detail only with respect to the pair of rolls 4 and 6. It is to be understood that the identical apparatus is empolyed with the other pair of rolls 8 and 10.

Extending between the transverse channel members 40 and 42 in front of, or on the outer side of, the dynamometer idle roll 4 (FIGS. 3 and 4) is a channel member 78, the upper leg 80 thereof being longer than the lower leg 82. The edges of the legs 80 and 82 are in engagement with the vertical wall 21 of the channel 20, and the lower corner of the channel member 78 rests against the bottom leg 28 of the channel 20. The channel member 78 is welded or otherwise rigidly secured to the channel 20. The bottom 84 of the channel member 78 is thus positioned to extend at a slight angle from the vertical of about seven degrees. Secured to the longitudinal channel 18 is a channel member 86, identical in configuration to the channel member 78.

The legs 88 and 90 of a pair of angle irons 92 and 94 are engaged with the rear face of the inclined lips 30 and 32, respectively, of the channels 18 and 20, and are welded thereto. The lower ends of the angle irons 92 and 94 extend nearly into engagement with their associated channel members 78 and 86 and form a closure for the space between said lips and said channel members.

Secured to the confronting faces of the transverse channel members 40 and 42, near the ends of the idle roll 4, are vertical bars 96 (FIG. 2), said bars being positioned so that their center lines extend generally tangentially to the periphery of the idle roll 4. A similar pair of vertical bars 98 is mounted on the channel members 40 and 42 near the ends of the drive roll 6. The bars 96 and 98 each have a bore in the upper end thereof, within which is mounted pivot pins 100 and 102, respectively. These pins are located outwardly of their associated rolls above a horizontal plane passing through the axis of the roll and on a radius inclined about 25 degrees to said plane.

Mounted on the pivot pins 100 is a pair of spaced lift arms 104, one at each end of the roll 4. Each arm is generally crescent-shaped and comprises a flat plate having an arcuate cutout 106 to clear the lower side of the boss of the bearing 58 for the stub shaft 54. Each arm 104 includes a generally upright portion 108 disposed outwardly of the stub shaft 54 and having a vertical edge extended beyond the outer side of the roll 4; an upwardly and inwardly inclined lift portion 110 extending beyond the inner side of the roll 4, and an intermediate horizontal portion 112, which interconnects the portions 108 and 110 beneath the stub shaft 54. Each arm 104 has a front edge portion 114 cut back on an angle of about 60 degrees. The upper end of the vertical portion 108 of each arm 104 has a bore 116 within which is received a bushing 118; the pivot pins 110 being received within said bushings to thereby pivotally mount the arms for movement toward and away from the axis of the roll 4.

A second pair of similar lift arms 120 is provided for the roll 6, each arm including an upright portion 122, an inclined lift portion 124, and an intermediate connecting portion 126. The arms 120 are pivotally mounted on the pivot pins 102. The floor 12 is provided with a shallow recess 128 beneath the rolls 4 and 6 for receiving the lower portions of the arms 104 and 120 when they are in their retracted position, as shown in FIG. 4.

The arms 104 are connected together near the lower end of the upright portion 108 thereof by an angle iron 130, which includes legs 132 and 134 arranged at an obtuse angle to each other of about 120 degrees. The legs 132 and 134 are directed away from the roll 4, and a flat pressure plate 136 extends therebetween, the lower edge of the plate 136 being welded at 137 to the edge of the leg 134 and the upper edge of said plate being welded at 139 to the outer side of the leg 132. The pressure plate 136 is positioned so that when the arms 104 are fully pivoted toward the axis of the roll 4, as shown in FIG. 3, said pressure plate will be disposed generally vertically. The arms 104 are also connected by a stiffener plate 138 welded at its ends to the arms 104, and at its upper edge 141 to the lower leg 134 of the angle iron 130.

The rear face of the upper leg 132 of the angle iron 130 is positioned to confront the idle roll 4, and extends generally tangentially to the surface of said roll when the arms 104 are fully pivoted toward the axis of the roll 4, as shown in FIG. 3. An elongated strip of brake lining material 140, preferably as long as the roll 4, is adhesively bonded to the rear face of the leg 132, and extends generally perpendicularly to a radial line emanating from the axis of the roll 4 when said brake material is in engagement with the surface of said roll.

The inclined lift portion 110 of the arms 104 is positioned between the rolls 4 and 6, and is designed to extend generally at a 45 degree angle when the arms are in their active position shown in FIG. 3. The upper edge of the lift portion 110 of the lift arms 104 has an inner portion 142 that extends generally horizontally when said arms are fully pivoted toward the axis of the roll 4; and an outer portion 144 that is inclined downwardly slightly from the horizontal, at an angle of about 10 degrees. The upper end of the lift portions 110 are received within and connected together by a lift plate in the form of a channel member 146. The bottom 148 of the channel member 146 has a profile corresponding to that of the upper end of the lift portions 110 and is welded thereto as indicated at 149. The inner leg 150 of the lift plate 146 is inclined away from the roll 4 to provide clearance when the arms 104 are retracted, as in FIG. 4.

The arms 120 associated with the roll 6 are interconnected by an angle iron 152 having a pressure plate 154 welded thereto, a stiffener plate 156 being welded to said arms 120 and to the angle iron 152. A strip of brake lining material 158 is secured to the rear face of the angle iron 152. The upper end of the inclined lift portions 124 are connected together by a lift plate in the form of a channel member 160. The angle iron 152, pressure plate 154, the stiffener plate 156, the brake material 158, and the lift plate 160 are all identical in construction and arrangement to the like elements associated with the arms 104 and roll 4. Attention is invited to the fact that the lift plates 146 and 160 substantially fill the space between the rolls 4 and 6, even when retracted. This provides a safety feature for workmen who may step on the rolls and have them turn underfoot, especially in an installation over a deep pit.

Figure 7:
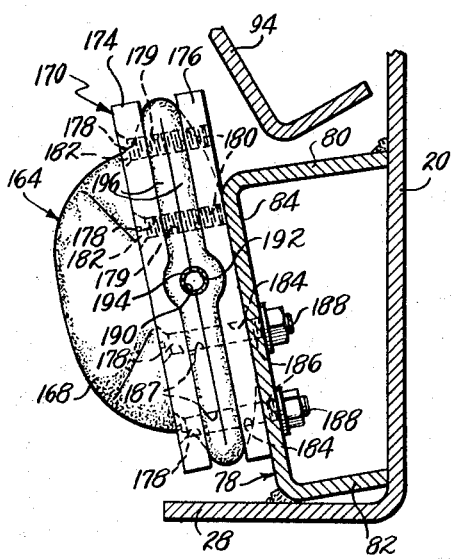
FIG. 7 is a fragmentary vertical sectional view taken on the line 7—7 of FIG. 6.
Figure 6:
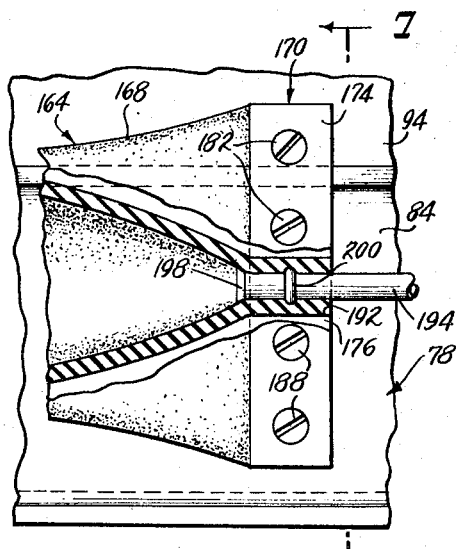
FIG. 6 is an enlarged fragmentary view of one end of the inflatable tubular diaphragm of FIG. 5, showing the manner in which said end is clamped to a backing channel and the manner in which the pressure supply tube is assembled with the diaphragm.

The lift arms 104 and 120 are simultaneously operated by interconnected, inflatable, tubular diaphragm assemblies 164 and 166, respectively, the construction of the diaphragm assembly 164 being shown in detail in FIGS. 5 to 7. The diaphragm assembly 164 includes a length of reinforced, collapsible tubular hose 168, the opposite ends of which are flattened and secured to the channel member 78 by clamps 170 and 172. The clamp 170 at the inlet end of the tubular diaphragm 164 comprises a pair of plates 174 and 176, the plate 174 having four spaced, countersunk openings 178 extending therethrough, arranged as an upper pair and a lower pair. The plate 176 has an upper pair of threaded bores 180 aligned with the upper pair of openings 178 in the plate 174, and screws 182 extend through the upper pair of openings 178, through holes 179 in the flattened end of the hose section 168, and into the threaded bores 180.

Aligned with the lower pair of openings in the plate 174 is a pair of openings 184 in the plate 176. These are aligned with a pair of openings 186 in the bottom wall 84 of the channel member 78. The clamp 170, and hence the flattened end of the hose section 168, are attached to the bottom wall 84 of the channel member 78 by bolts 188, which pass through the aligned openings 178, 184 and 186, and through openings 187 in the end of the hose section 168.

The surfaces of the plates 174 and 176, between which the flattened end of the hose section 168 is clamped, have confronting, arcuate recesses 190 and 192, respectively, the axes of which are aligned with the longitudinal axis of said hose section. A pressure supply and exhaust tube 194 is clamped between the side walls 196 of the hose section 168 in the region of the recesses 190 and 192, the inner end 198 of said tube being flared, as shown in FIG. 6. The tube 194 has an annular retention rib 200 centrally thereof which also cooperates with the side walls 196 and the clamp 170 to provide an effective seal therearound. Air under about 150 pounds per square inch pressure is supplied to and exhausted from the diaphragm 164 through the tube 194 to actuate the arms 104 and 120, as will be explained later.

The clamp 172 at the opposite end of the diaphragm assembly 164 includes a pair of plates 202 and 204, and is identical to the clamp 170 except that the plates 202 and 204 do not have arcuate recesses in their confronting faces. The plates 202 and 204 are secured together and to the flattened end of the hose section 168 by screws 206. Bolts 208 further secure these plates together and to the channel member 78.

The diaphragm assembly 166 is identical to the diaphragm assembly 164, and includes a section of collapsible hose 210, the ends of which are held closed and secured to channel members 86 by clamps 212 and 214. The diaphragm assembly 166 is supplied with air under pressure through tube 216, which is mounted in the same manner as the tube 194.

The tubes 194 and 216, FIGS. 1 and 2, are connected to the opposite ends of a T-fitting 218, the stem of which is connected by a tube 220 to a fitting 222 on the outlet end of a control valve 224. In this manner, the diaphragm assemblies 164 and 166 are connected in parallel. The control valve 224 is supplied with air under pressure from a conduit 226, through a pressure regulator 228 connected with the inlet of said control valve.

As is shown in FIG. 1, the pair of rolls 8 and 10 has lift arms 230 and 232, respectively, associated therewith and pivotally mounted on the channel members 36 and 38 in the same manner as the lift arms 104. The arms 230 and 232 also include lift portions 235 and 237 (FIG. 2) that terminate at their upper end within lift plates or channel members 234 and 236 corresponding to the lift plates 146 and 160. The arms 230 and 232 are operated by inflatable diaphragm assemblies 238 and 240, respectively, identical to the diaphragm assemblies 164 and 166. The inlet end of the assembly 240 is connected by a tube 244 with a T-fitting 246, which is connected by a tube 248 to the diaphragm assembly 238. A tube 250 connects the T-fitting 246 to the fitting 222 on the outlet side of the control valve 224, whereby bolt diaphragm assemblies 238 and 240 are operated substantially simultaneously, together with the simultaneous operation of the diaphragm assemblies 164 and 166. Thus, the diaphragm assemblies 230 and 232 are connected in parallel with each other and in parallel with the diaphragm assemblies 164 and 166.

It is to be understood that the diaphragm assemblies 238 and 240 are associated with brake applying elements identical to those shown in FIGS. 3 and 4 associated with the diaphragm assemblies 164 and 166, whereby a braking force can be applied to the rolls 8 and 10 at the same time that a braking force is a applied to the rolls 4 and 6.

Referring now to FIG. 4, it will be seen that when the diaphragms 164 and 166 are inactive or collapsed, the lift arms 104 and 120 are in the retracted or released condition and the lower or intermediate portions 112 and 126, repectively, thereof will be received in the recess 128 in the floor 12. In this position, the lift plates 146 and 160 on the upper ends of the inclined lift portions 110 and 124 will be positioned below and out of engagement with a vehicle wheel W cradled on the rolls 4 and 6.

Referring now to FIG. 4, it will be seen that when the diaphragms 164 and 166 are inactive or collapsed, the lift arms 104 and 120 are in their retracted or released condition and the lower or intermediate portions 112 and 126, respectively, thereof will be received in the recess 128 in the floor 12. In this position, the lift plates 146 and 160 on the upper ends of the inclined lift portions 110 and 124 will be positioned below and out of engagement with a vehicle wheel W cradled on the rolls 4 and 6. Further, the strips of brake material 140 and 158 will then be out of engagement with their associated rolls 4 and 6. Thus, the rolls 4 and 6 are then in no way restrained while power is being transferred thereto from one of the drive wheels W.

It will be understood that the pairs of lift arms 230 and 232 will assume the same retracted position as the pairs of lift arms 104 and 120, and that the rolls 8 and 10 will be engaged by the other drive wheel of the vehicle and will not be restrained from rotating by the brake assembly (not shown) associated therewith.

In operating the chassis dynamometer, a motor vehicle is first driven onto the rolls 4–6 and 8–10, so that the drive wheels W of said vehicle rest upon said rolls. When driving a vehicle onto the dynamometer, it is normally not necessary to brake the dynamometer rolls. Hence, the brake means is retracted, as described above. After the vehicle drive wheels W are cradled between the rolls 4–6 and 8–19, the dynamometer 70 is operated in the usual manner by the drive rolls 6 and 10 to check engine and vehicle performance.

When it is desired to remove the motor vehicle from the dynamometer, the vehicle transmission is placed in neutral, or preferably the engine is stopped so that the wheels W are stationary. Air is then simultaneously supplied under pressure to the diaphragm assemblies 164, 166, 238 and 240, through the pressure regulator 228 and the control valve 224, and through the tubes connected therewith. The diaphragms then expand and tend to assume a cylindrical form as shown with respect to the diaphragms 164 and 166 in FIG. 3. Such expansion acts through the pressure plates to cause the pairs of arms 104–120 and 230–232 to be simultaneously pivoted toward the axis of their associated rolls 4–6 and 8–10, to apply a braking force thereto, and to lift the vehicle wheels W out of engagement with said rolls.

More specifically, when the lift arms 104, 120, 230 and 232 are actuated to pivot them toward the axis of their associated rolls, the brake material will engage their respective rolls 4–6 and 8–10 to effect a braking action thereon. Further, as the brake means is applied, the lift portions 110–124 and 235–237 will substantially simultaneously elevate the lift plates 146–148 and 234–236 to engage the wheel W and lift them out of engagement with the rolls 4–6 and 8–10, respectively. It will be noted that the outer, inclined portions on the upper edges of the lift portions, and the correspondingly shaped inclined portions of the channel-shaped lift plates, cradle the wheels W therebetween, as shown in FIG. 3, so that there is no tendency for the wheels to roll off the lift plates. When the lift arms are positioned as shown in FIG. 3, the rolls 4–6 and 8–10 are locked against rotation and the wheels W are out of engagement therewith, so that the motor vehicle (not shown) upon which the wheels W are mounted can easily be driven off the dynamometer apparatus in either a forward or a rearward direction. After the vehicle has been removed from the chassis dynamometer, the air is released from the diaphragm assemblies 164, 166, 238 and 240, whereupon the weight of the arms 104–120, 230–232 and their associated lift plates 146, 160, 234 and 236 causes them to pivot downwardly by gravity away from their associated rolls into retracted position, collapsing their associated diaphragms to the condition shown in FIG. 4.

The brake structure of the present invention requires little if any servicing. Because the lift arms are all operated by inflatable diaphragms, there are no critical adjustments or tolerances for the brake mechanism, and the life expectancy of the brake apparatus is prolonged over what might otherwise be obtained with some other structure.

Another feature of the invention is that the diaphragm assemblies 164, 166, 238 and 240 can all be operated remotely and substantially simultaneously, whereby the roll brake and vehicle wheel lifting apparatus can be operated from a convenient distance from the chassis dynamometer.

It will be understood that the brake means illustrated and described herein can be used independently of the vehicle wheel lift means associated therewith and vice versa; provided, that when the well lift means is used alone, suitable stop means, such as abutments on the frame, is embodied to limit the pivotal movement of the lift arms in the direction of the axes of their associated rolls.

It will also be understood that a single lift plate may be used particularly in the servicing of lightweight, small or "compact" vehicles.

Obviously, many other modifications and variations of the present invention are possible in the light of the above teaching. It is, therefore, to be understood that within the scope of the appended claims, the invention may be practiced otherwise than as specifiically shown and described.

I claim:

1. In a chassis dynamometer having a frame and roll means mounted upon said frame for rotation about a longitudinal axis and arranged to receive a vehicle wheel thereon; means operable to brake said roll means against rotation and to, substantially simultaneously with said braking, lift said vehicle wheel out of engagement therewith, comprising: arm means having a pivot mounted upon said frame on one side of the axis of said roll means for pivotal movement in a direction toward and away from said axis, said arm means being constructed to extend beyond the other side of said roll means and carrying means engageable with said vehicle wheel; brake means carried by said arm means engageable with said roll means to hold the same against rotation when said arm means is pivoted toward said axis of said roll means; and means operable to pivot said arm means toward said axis of said roll means.

2. Chassis dynamometer means as recited in claim 1, wherein the means operable to pivot the arm means toward the axis of the roll means comprises an inflatable tubular diaphragm mounted upon the frame in confronting relation to said arm means and substantially parallel with said roll means.

3. In a chassis dynamometer having a frame and roll means mounted upon said frame for rotation about a longitudinal axis and arranged to receive a vehicle wheel thereon; means operable to brake said roll means against rotation and to, substantially simultaneously with said braking, lift said vehicle wheel out of engagement therewith, comprising: arm means having a pivot mounted upon said frame on one side of the axis of said roll means for pivotal movement in a direction toward and away from said axis, said arm means being constructed to extend beyond the other side of said roll means and carrying lift plate means engageable with said vehicle wheel means; brake means carried by said arm means engageable with said roll means on said one side of said roll means to hold the same against rotation when said arm means is pivoted toward said axis of said roll means; and fluid pressure actuated means operable to pivot said arm means toward said axis of said roll means.

4. In a chassis dynamometer, having a frame and a pair of rolls mounted upon said frame for rotation about parallel longitudinal axes and arranged to receive a vehicle wheel thereon; means operable to brake at least one of said rolls against rotation and to, substantially simultaneously with said braking, lift said vehicle wheel out of engagement therewith, comprising: a pair of lift arms having a pivot mounted upon said frame at the opposite ends of at least one of said rolls and on one side of the axis of said one roll for pivotal movement in a direction toward and away from said axis, said pair of arms being constructed to extend beyond the other side of said one roll and carrying wheel lift means engageable with said vehicle wheel; brake means also carried by said pair of said arms engageable with said one roll to hold the same against rotation when said arms are pivoted toward said axis of said one roll and fluid pressure actuated means to pivot said pair of arms toward said axis of said one roll.

5. Chassis dynamometer means as recited in claim 4, wherein the brake means includes an elongated member extending between the lift arms and lying generally parallel to the longitudinal axis of said one roll; and wherein friction brake material is secured to said elongated member and disposed to confront and engage with the outer surface of said one roll.

6. Chassis dynamometer means as recited in claim 5, wherein the wheel lift means includes an elongated lift plate of approximately the length of the rolls interconnecting the lift arms and lying generally parallel to the longitudinal axis of the rolls.

7. In a chassis dynamometer having a frame, and a pair of rolls mounted upon said frame for rotation about parallel longitudinal axes and arranged to receive a vehicle wheel thereon: means operable to brake said pair of rolls against rotation and to, substantially simultaneously with said braking, lift said vehicle wheel out of engagement therewith, comprising: a pair of lift arms for each roll, each pair of lift arms having a pivot mounted upon said frame at the opposite ends of their asociated roll and on one side of the axis of the roll for pivotal movement in a direction toward and away from said axis, each pair of said arms being constructed to extend beyond the other side of the roll associated therewith and carrying a lift plate engageable with a vehicle wheel; brake means carried by each of said pairs of arms engageable with the roll associated therewith to hold the same against rotation when said pairs of arms are pivoted toward the axis of their associated rolls; and fluid pressure actuated means operable to simultaneously pivot said pairs of lift arms toward the axis of their associated rolls.

8. A chassis dynamometer, comprising: an elongated frame; at least one pair of spaced, parallel cylindrical rolls, each of said rolls having a shaft mounted upon said frame for rotation about its axis, said rolls being arranged to cradle a wheel of a vehicle thereon; a pair of arms for each roll having a pivot mounted upon said frame located to provide for pivotal movement of said arms toward and away from the axis of their associated rolls, said arms each including a generally upright portion disposed on the outer side of said rolls; a brake material-carrying member interconnecting the upright portion of each pair of said arms, said brake material being engageable with said rolls to lock the same against rotation when said pairs of arms are pivoted toward the axis of their associated rolls; and means operable to pivot said pairs of arms toward the axis of their associated rolls.

9. A chassis dynamometer as defined in claim 8, wherein the means operable to pivot the pairs of arms includes inflatable diaphragms mounted upon the frame and arranged to apply force to the brake material-carrying members.

10. A chassis dynamometer, comprising: an elongated frame; at least one pair of spaced, parallel cylindrical rolls, each of said rolls having a shaft mounted upon said frame for rotation about its axis, said rolls being arranged to receive a wheel of a vehicle thereon; a pair of lift arms having a pivot mounted upon said frame and located to provide for movement of said lift arms toward and away from the axis of their associated rolls, said lift arms including lift portions extending beyond the inner side of said rolls; an elongated lift plate connecting the lift portion of each pair of said lift arms, whereby said lift plates are disposed side-by-side between said rolls, said lift plates being engageable with a vehicle wheel to raise it off said rolls when said pairs of lift arms are pivoted toward the axis of their associated rolls; and means operable to pivot said pairs of arms toward the axis of their associated rolls.

11. A chassis dynamometer, comprising: a frame; at least one pair of spaced, parallel cylindrical rolls, each of said rolls having a shaft mounted upon said frame for rotation about its axis, said rolls being arranged to receive a wheel of a vehicle thereon; a pair of lift arms having a pivot mounted upon said frame at a position outwardly of the axis of each of said rolls for movement of said lift arms toward and away from the axis of their associated rolls, said lift arms being located adjacent the ends of said rolls and extending beneath the shaft of their associated rolls and including lift portions disposed between said rolls and substantially filling the space therebetween and being engageable with a vehicle wheel to lift the same off the rolls when said pairs of lift arms are pivoted toward the axis of their associated rolls; and means carried by said frame operable to pivot said pairs of actuator arms toward the axis of their associated rolls.

12. A chassis dynamometer as defined in claim 11, wherein the adjacent surfaces of said lift plates are inclined downwardly toward each other to cradle a vehicle wheel after it has been lifted off the rolls.

13. A chassis dynamometer, comprising: an elongated frame; at least one pair of spaced, parallel cylindrical rolls, each of said rolls having a shaft mounted upon said frame for rotation about its axis, said rolls being arranged to receive a wheel of a vehicle thereon; a pair of lift arms each having an upright portion pivotally mounted upon said frame at a position on the outer side of each of said rolls for movement of said lift arms toward and away from the axis of their associated rolls, said lift also including lift portions extending beyond the inner side of said rolls; said lift portions having an upper end normally disposed below the periphery of a vehicle wheel while supported on said rolls; an elongated lift plate interconnecting the upper end of the lift portion of each pair of lift arms, said lift plates being engageable with said vehicle wheel when said pairs of lift arms are pivotally moved toward the axis of their associated rolls; brake means carried by each pair of lift arms including a member interconnecting the upright portions of each pair of lift arms and carrying brake material positioned to be engageable with their associated rolls when said pairs of lift arms are pivotally moved toward the axis of said rolls; and means operable to pivotally move said pairs of lift arms toward the axis of their associated rolls.

14. A chassis dynamometer as defined in claim 13, in which the lift arms are generally crescent-shaped, and the upright and lift portions thereof are interconnected by a generally horizontal intermediate portion.

15. A chassis dynamometer as defined in claim 13, wherein the axis of the pivot for each lift arm lies on a radial line extending on an angle of about 25° to a horizontal plane passing through the axis of the rolls.

16. A chassis dynamometer as defined in claim 13, wherein the means operable to pivotally move the pairs of lift arms includes fluid pressure operable means mounted upon the frame and arranged to apply force to the brake material-carrying members.

17. A chassis dynamometer as defined in claim 16, wherein each brake material-carrying member includes a pressure plate, and wherein the fluid pressure operable means is an elongated, inflatable, tubular diaphragm engageable with the pressure plate.

18. A chassis dynamometer as defined in claim 17, wherein the inflatable diaphragms are clamped at their ends to the frame and are connected in parallel for simultaneous inflation.

References Cited

UNITED STATES PATENTS

| | | | |
|---|---|---|---|
| 1,184,159 | 5/1916 | Becker | 73—123 |
| 2,583,201 | 1/1952 | Bennett | 73—117 |
| 2,709,362 | 5/1955 | Marcus et al. | 73—117 |
| 2,803,132 | 8/1957 | Clayton | 73—117 |

RICHARD C. QUEISSER, *Primary Examiner.*

JERRY W. MYRACLE, *Assistant Examiner.*